April 15, 1941.   D. H. CREPEAU   2,238,462
PIPE JOINT
Filed May 1, 1940
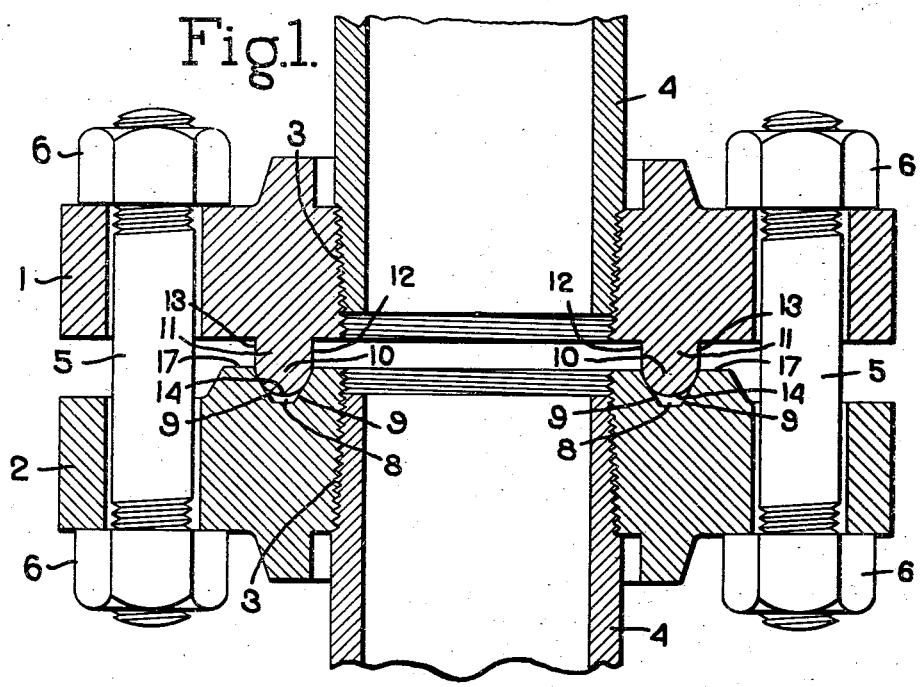
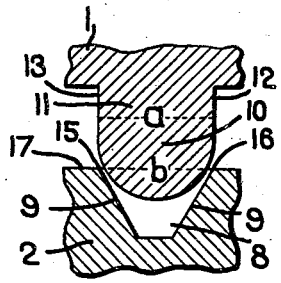
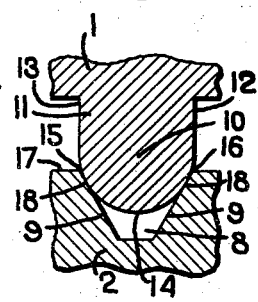
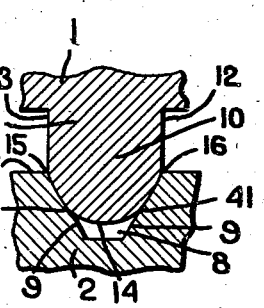
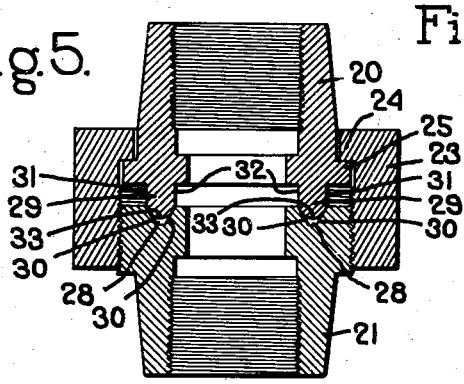
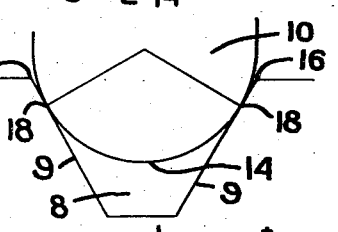
Inventor.
Daniel H. Crepeau
by Heard Smith & Tennant.
Attys.

Patented Apr. 15, 1941

2,238,462

UNITED STATES PATENT OFFICE 2,238,462

PIPE JOINT

Daniel H. Crepeau, East Braintree, Mass.

Application May 1, 1940, Serial No. 332,720

1 Claim. (Cl. 285—1)

This invention relates to pipe joints and has for one of its objects to provide a novel construction by which a tight nonleakable joint can be made without the use of packing, gaskets and the like.

A further object of the invention is to provide a novel joint construction which will permit the joint to be readily broken and, when remade again, will provide just as leak-proof a joint as when the pipes were first coupled together.

A further object of the invention is to provide a novel pipe joint which will effectively resist any expansion or contraction load that may be imposed upon it by reason of changes in pressure or temperature, and will maintain its leak-proof characteristic even when subjected to sudden and extreme variations in temperature.

Other objects of the invention are to improve pipe joints in various particulars as will be more fully hereinafter set forth.

My invention is applicable either to a pipe joint of the flange type or to a union. The invention is also applicable to valve bonnets, manholes and their covers, shell covers on vessels containing either low or high pressure, and other devices which embody in their structure pipes or conduits which are coupled together.

In the drawing, in which I have shown some selected embodiments of the invention:

Fig. 1 is a sectional view showing a pipe joint of the flange type embodying my invention.

Fig. 2 is an enlarged fragmentary sectional view showing the two flange members slightly separated from each other and before they are clamped together to complete the joint.

Fig. 3 is an enlarged fragmentary sectional view illustrating the two flange members when they are first brought into contact but before they are tightly clamped together.

Fig. 4 is a similar view showing the flange members fully clamped together.

Fig. 5 is a sectional view of a union embodying my invention.

Fig. 6 is a diagrammatic view on an enlarged scale illustrating the manner in which the two members to be coupled together are brought into their coupling relation.

Referring first to Figs. 1, 2 and 3, I and 2 indicate two pipe flanges which are to be coupled together, each flange having a screw-threaded opening 3 to receive the screw-threaded end of a pipe section 4.

5 indicates the clamping bolts which extend through the two flanges and by which they are tightly clamped together, as usual in pipe flanges. Each bolt 5 is shown as having nuts 6 screw-threaded to both ends thereof.

The flange 2 is provided with an annular recess 8 having flat tapering walls 9 which converge toward each other from the mouth to the bottom of the groove and which form an obtuse angle with said bottom, said groove or recess thus being of progressively decreasing width from its mouth to the bottom thereof.

The flange I is formed with a solid annular rib 10 which cooperates with the annular groove 8 to form the tight joint. The inner portion 11 of the rib 10 has concentric cylindrical side walls 12 and 13. Said rib is rounded at its outer edge, thereby presenting the convex surface 14, and in the preferred embodiment of my invention, this convex surface 14 may be a semi-circular surface. The rib 10, therefore is a solid rib which presents two parallel cylindrical side faces 12 and 13 that are connected at the outer end of the rib by a semi-circular convex face 14. The width of the rib, or the dimension between the parallel side faces 12 and 13, is the same as the width of the groove 8 at the mouth thereof. In other words, the distance $a$ between the parallel walls 12 and 13 of the rib is exactly the same as the distance $b$ between the opposite edges 15 and 16 of the groove 8 at the surface 17 of the flange 2.

When the two flanges I and 2 are to be coupled together to produce a leak-tight joint, said flanges will first be brought into their coupling relation, with the rib 10 registering with the groove 8. When the flanges are first brought into contact, the rounded surface 14 of the rib will partially enter the groove 8, said rounded surface contacting with each of the flat walls 9 at the points 18 slightly within the mouth of the groove, as seen best in Fig. 6.

As the nuts 6 are turned up for tightening the joint, the rounded edge of the rib 10 will be forced into the groove 8 with sufficient force to cause said rounded face of the rib and each flat face of the groove to conform to each other, thereby forming an annular seating contact surface of appreciable width between said rib and each side wall of the groove. This seating contact surface throughout which the contacting faces accurately conform to each other is produced by a slight flow of the metal forming the rib and that forming the side walls of the groove 8, which flow causes a deformation of the contacting surfaces between the rib and the walls of the groove that results in increasing the extent of the contacting surfaces from that shown diagrammatically in Fig. 6 to that shown in Fig. 4, and thereby there is established two annular contact bands or zones which extend from the mouth of the groove to a point 41 well toward the bottom thereof, as best seen in Fig. 4. This result is possible because the thickness of the rib indicated by the dimension $a$ in Fig. 2 is no greater than the maximum width of the groove indicated by the dimension $b$, and also because it is the rounded surface 14 of the rib which enters the groove and has contact with the flat walls thereof along lines 18 well within the mouth of the groove when the flanges are first brought into coupling relation. As stated above, the tightening of the nuts 6 produces sufficient deformation of the metal of the rib and the metal forming the side walls of the groove to produce the wide contact band that results in the leak-proof joint.

With my invention, it is possible to make a perfectly tight leak-proof joint which will remain leak-proof in spite of any expansion or contraction which the flanges may undergo when the joint is subjected to sudden and wide changes of temperature.

My improved joint is extremely simple as it does not involve the use of any gasket or other auxiliary packing. The special relation between the transverse dimensions of the rib and the groove above referred to are extremely effective in producing a perfectly leak-proof joint and one which can be subjected to high temperatures or high pressures without danger of springing a leak.

In Fig. 4, I have shown my invention as applied to a union. In said figure, 20 and 21 are the two parts of the union to be coupled together, each section being interiorly screw-threaded at 22 to receive the screw-threaded end of a pipe section. 23 indicates the nut by which the two sections 20 and 21 are coupled together, said nut having the usual inwardly directed flange 24 engaging an outwardly directed flange 25 on the union section 20, and also having screw-threaded engagement with the union section 21 as shown at 26.

The section 21 is provided with the annular groove 28 and the section 20 is formed with the rib 29 which cooperates with said groove. The groove has the flat inclined faces 30, and the rib 29 is formed with the two parallel circular walls 31, 32, which are spaced apart a distance equal to the maximum width of the groove 28 at its mouth. This rib is also provided with the rounded edge 33.

The rib and groove of the union function in the same way as do the rib and groove of the flanges shown in Figs. 1, 2 and 3.

I claim:

A pipe joint comprising two metal coupling members, one of which has an annular groove initially formed with flat side walls which converge toward each other from the mouth to the bottom of the groove and form obtuse angles with said bottom and the other of which is provided with an annular solid rib having parallel cylindrical side walls and a rounded edge presenting a continuous unbroken curved surface extending from one side wall to the other, the parallel cylindrical side walls being spaced apart a distance equal to the width of the groove at its mouth, and means to clamp the two coupling members together with the rounded edge of the rib wedged into the mouth of the groove with sufficient force to cause said rounded edge and each wall of the groove to conform to each other throughout an annular zone extending from the mouth of the groove well toward the bottom thereof by reason of a slight flowing action of the metal of both the rib and that forming the wall of the groove, whereby said rib has a seating contact with each wall of the groove throughout said zone.

DANIEL H. CREPEAU.